United States Patent [19]

Seydelmann

[11] 3,847,360

[45] Nov. 12, 1974

[54] FOOD CHOPPER

[76] Inventor: Ludwig Seydelmann, N. Holderlinstrasse, 9, Stuttgart, Germany

[22] Filed: Nov. 1, 1972

[21] Appl. No.: 302,725

[52] U.S. Cl............... 241/82.5, 241/82.4, 241/82.7
[51] Int. Cl.... B02c 18/18, B02c 18/30, B02c 18/36
[58] Field of Search ........ 241/82.3, 82.4, 82.5, 82.7

[56] References Cited
UNITED STATES PATENTS

| 840,041 | 1/1907 | Carpener et al. .................. 241/82.4 |
| 3,536,115 | 10/1970 | Weiler ............................. 241/82.5 |

*Primary Examiner*—Roy Lake
*Assistant Examiner*—E. F. Desmond
*Attorney, Agent, or Firm*—Karl F. Ross; Herbert Dubno

[57] ABSTRACT

A food chopper has a cylindrical housing forming a food-advance chamber for an auger and provided at one end with an outlet die for the chopped food. A conveyor which can be formed with a surface directly juxtaposed with the die and inclined thereto so that rotation of this conveyor forces food into the perforated die. A blade is carried on the conveyor and trails the inclined surface to cut off food pushed into the die. This blade projects about 3 millimeters from the conveyor and can be adjustable to take up wear. In addition a second such conveyor and a second such die plate can be provided for very fine chopping of the food, with the two conveyors rotationally coupled. In this arrangement it is possible to mount the blade of the second conveyor tangential to a hub, with a helical groove leading from the blade base past the second plate to carry off fibrous matter such as gristle or the like.

7 Claims, 12 Drawing Figures

FOOD CHOPPER

FIELD OF THE INVENTION

The present invention relates to an apparatus for chopping food. More specifically this invention concerns a food grinder or chopper as used with meat and the like.

BACKGROUND OF THE INVENTION

A food chopper usually has a feed auger formed with a screw thread that moves the material to be ground up along a chamber to an end which is provided with a fixed perforated plate. Between the auger and this plate there is provided some kind of cutting blade in many arrangements. This blade is rotationally connected to the auger and serves to shear the material to be ground by cutting off those portions of this material which are forced through the perforations of the plate by the auger.

In another common arrangement the auger itself first gives the material a coarse grinding by pushing it through a first perforated plate formed with relatively large holes. Behind this first plate is a rotating blade which coacts with a plate formed with smaller perforations to further comminute the material.

Both such devices suffer from a common defect: The material being chopped can build up against the end of the auger and press all of the various cutting elements together axially. This buildup makes the auger very difficult to rotate and can even jam the device altogether.

OBJECTS OF THE INVENTION

It is therefore an object of the present invention to provide an improved apparatus for comminuting foodstuffs.

Another object is the provision of an improved meat chopper or mincer which is not likely to jam.

SUMMARY OF THE INVENTION

These objects are achieved in a device of the abovedescribed type having a rotatable advancing element or conveyor formed with an inclined surface or worm that serves to advance the foodstuff and push it through the cutting die, this inclined surface being directly juxtaposed with the surface of the die, with nothing between it and the face of the die plate.

According to another feature of this invention the face of this rotatable element turned toward the die is provided with a blade having a cutting edge which sweeps the die plate as the advancing element is rotated.

In such an arrangement the material being minced is pushed right up to the perforated die plate and into the holes in this plate. The very short blade, being not longer axially than about 3 millimeters, which just trails this surface in the direction of rotation, then cuts off portions of the foodstuff engaged in the holes.

This conveyor can merely be the feed auger of the device, or it can be a separate element having an inclined surface either constituting a continuation of the worm of the auger, or inclined in the opposite direction in the case where this element is used with an auger and rotated in the opposite direction. In such an embodiment the rotation speed of the auger determines throughput and the rotation speed of the cutting element determines fineness.

DESCRIPTION OF THE DRAWING

The above and other objects, features, and advantages of the invention will become more readily apparent from the following description, reference being made to the accompanying drawing in which:

FIGS. 5A, 5B, and 5C are detail views of the modifications;

SPECIFIC DESCRIPTION

The meat grinders known in the art usually comprise an auger having a worm II which advances pieces I of meat or the like. As shown in FIG. 1A, a first fixed perforated plate or die III is provided which has holes V against whose edges IV these pieces I are pressed by the rotating auger. The holes V are large so that those pieces forced into these holes and protruding therebeyond can be cut by a blade VI rotating between the plate III and a second plate VII with smaller holes. When, however, a very tough piece of meat comes between the worm II and the edge IV the only action that can result is an axial displacement of the auger, or of the plates III and VII with the blade VI, since the worm II was not meant to and cannot cut at all. This axial pressure results in a clutch type of action whereby all of the various fixed and rotating elements engage each other and rub together, causing substantial wear and a substantial decrease in operating efficiency.

Figure 1:
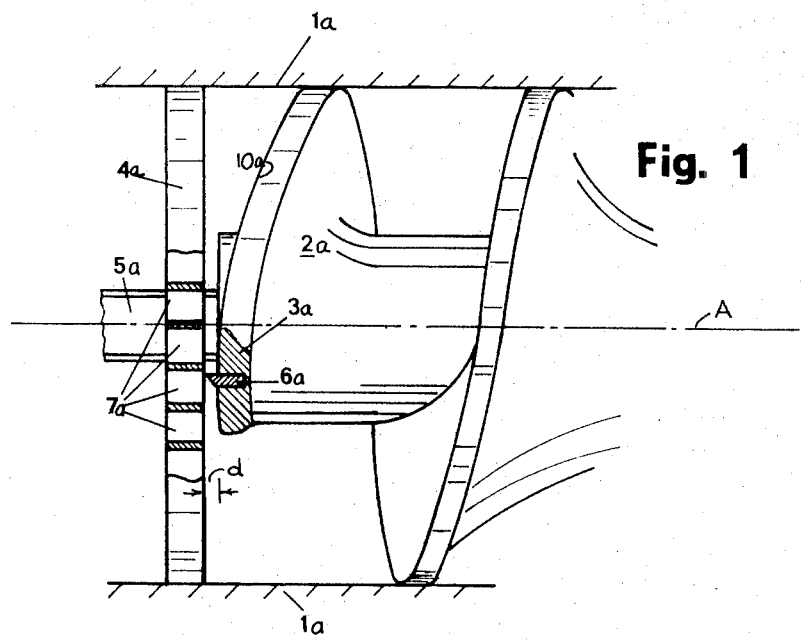
FIGS. 1–5 are side views, partly in section illustrating five embodiments of the present invention.
Figure 1A:
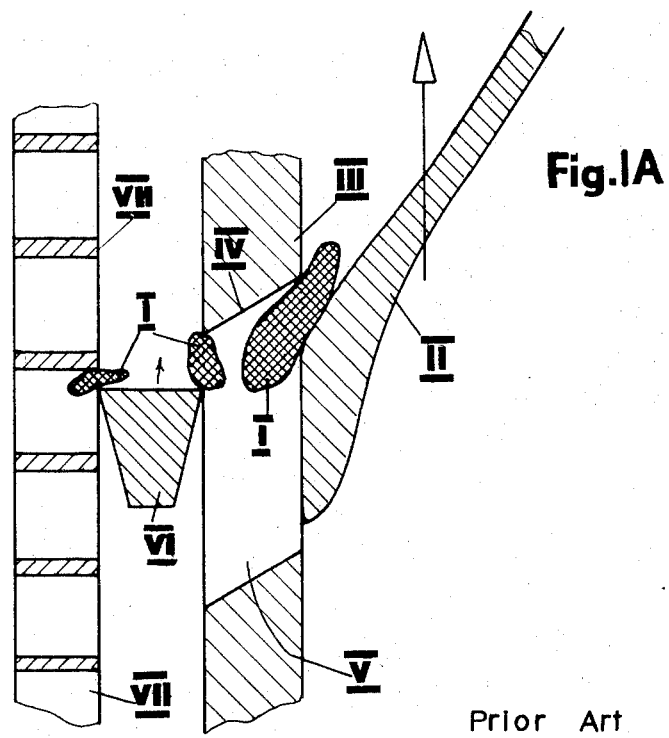
FIGS. 1A and 1B are diagrammatic illustrations showing how prior-art devices function.
Figure 1B:
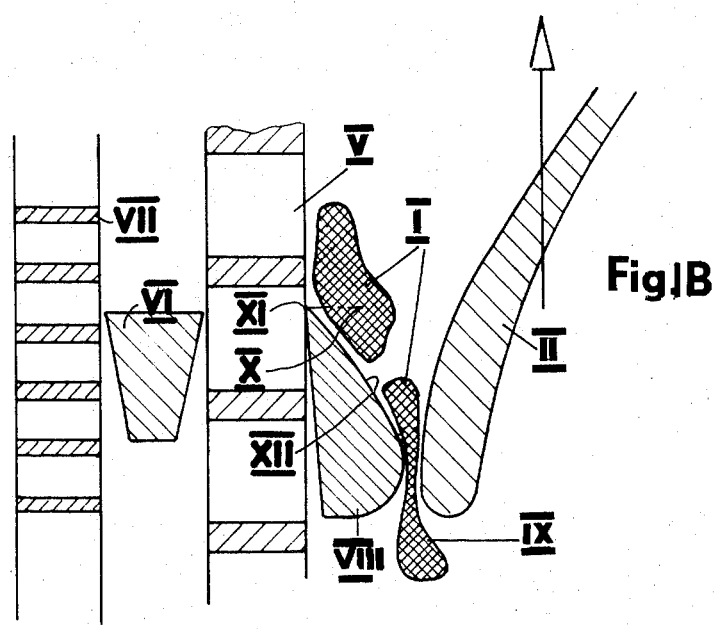

In FIG. 1B the grinder has the same parts but a blade VIII is provided between the end of worm II and the plate V. This blade VIII has a cutting edge XI and an inclined surface XII which is directed away from the plate V. Although in this arrangement the only type of axial pressure that can result is that of pieces I forcing themselves between the blade VIII and the auger II, as shown at IX, but the blade VIII serves to push the pieces I away from, rather than toward the plate V. Even in arrangements where the blade VIII is of square section, as shown at X, the pieces I are not directly urged against the plate V by the auger II, but are pushed by the following pieces of meat.

According to the present invention, as shown in FIG. 1, an auger 2a is rotatable in a cylindrical housing 1a about an axis A. This auger has an advancing surface 10a which ends short of the die 4a by a distance $d$ equal to 3 millimeters. A radially extending blade 6a projects at right angles from the end of this auger 2a and sweeps over the plate 4a so as to cut off any foodstuff partially pushed into the holes 7a of this plate 4a. The end of the auger has a shaft 5a which is journaled in the plate 4a for support.

Figure 2:
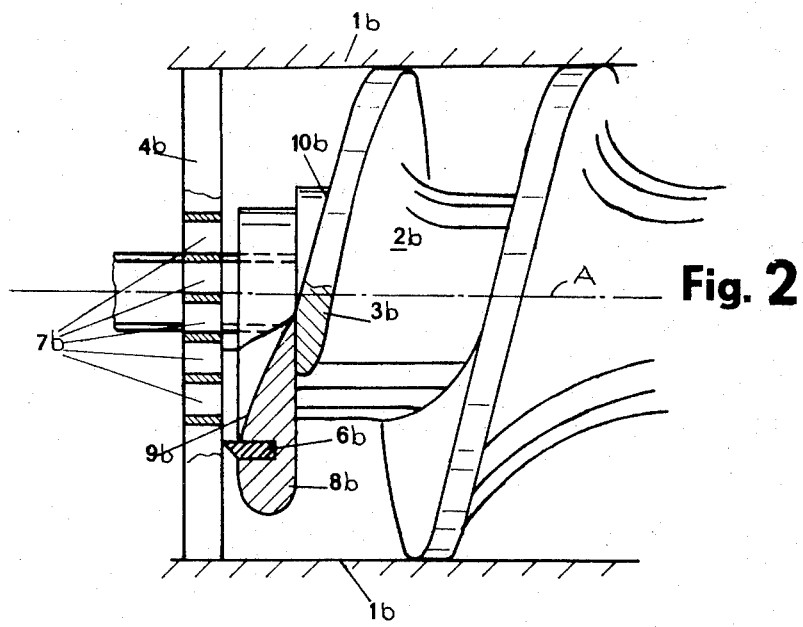

In FIG. 2 a similar arrangement is shown, the same reference numerals being used with the subscript $b$ wherever possible. Here a rotatable element 8b is provided between the auger 2b and the plate 4b. This element is formed with an inclined surface 9b of the same pitch as the helical advancing surface 10b of the auger 2b. The blade 6b is mounted on this element 8b. The auger can be rotated at the same speed or slower than the element 8b so as to adjust throughput and fineness of chop.

Figure 3:
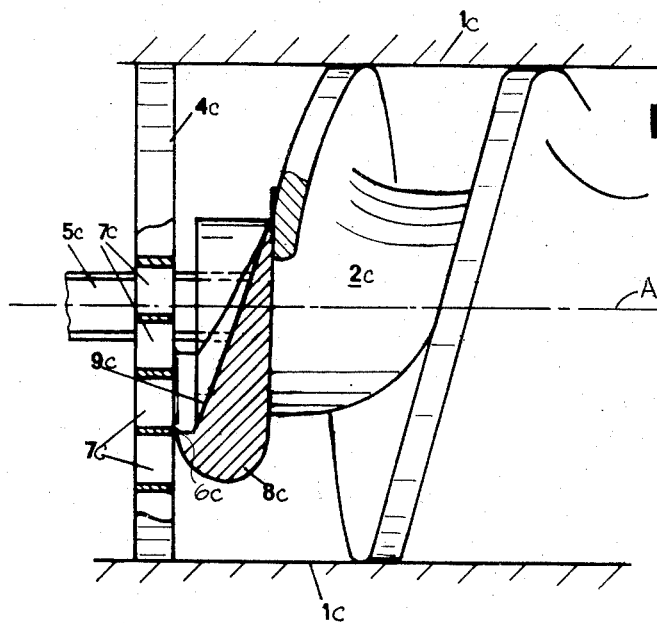

The arrangement of FIG. 3 is substantially identical to that of FIG. 2 except that the rotatable element 8c is formed integrally with the blade 6c. In this manner the end of the inclined surface 9c is defined by the blade 6c, making for a very efficient unit.

Figure 4:
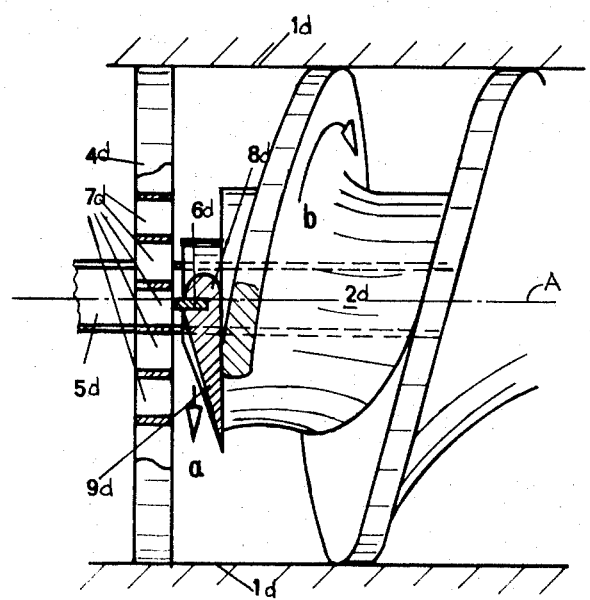

FIG. 4 shows a chopper also similar to that of FIG. 2 but where the separate cutting element 8d is arranged for rotation in a direction a opposite to the rotation sense b for the auger 2d. This allows for the element 8d to be rotated at relatively high speed, for a very fine chopping of the foodstuff, while the rotation rate of the auger 2d is adjusted according to the desired throughput, the two measures of performance being only slightly interdependent.

Figure 5:
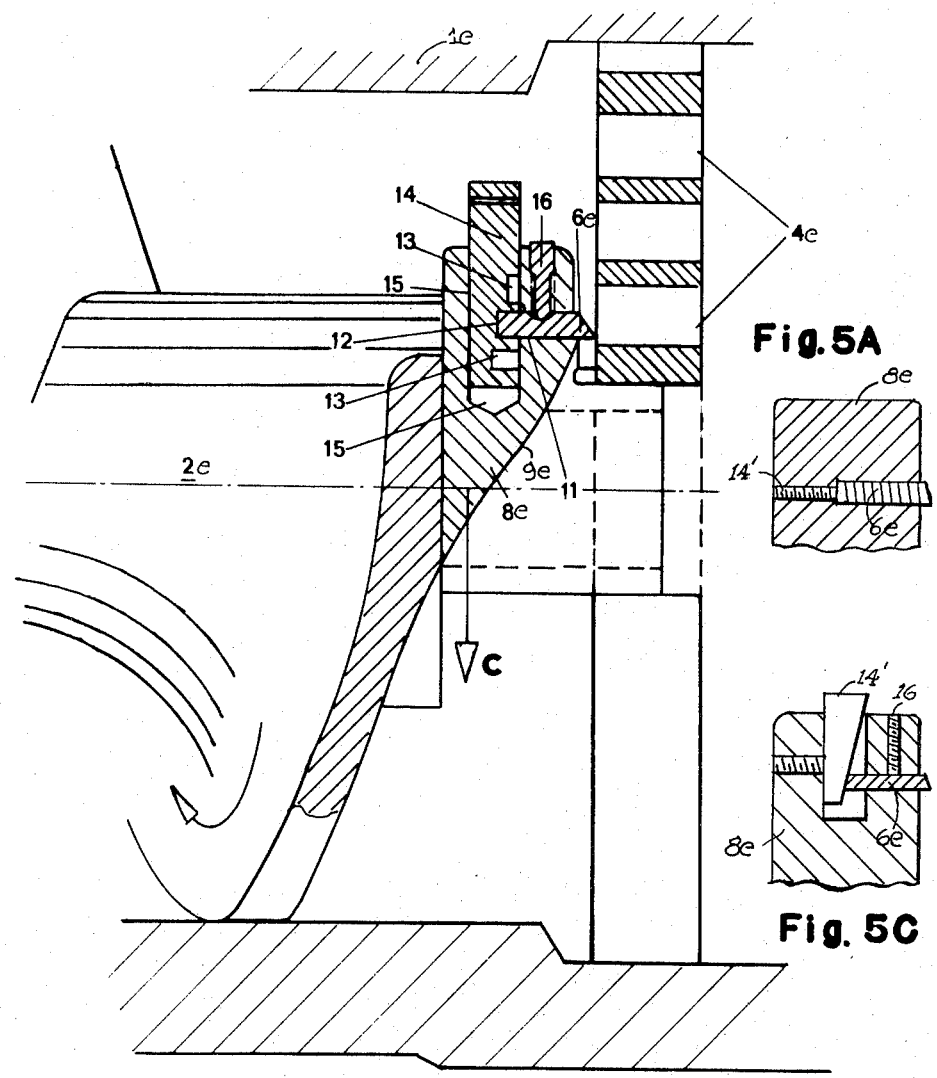

The grinder of FIG. 5 once again is similar to that of FIG. 2 but the blade 6e here is adjustable. It can have its rear end 12 seated in one of three slots 13 formed in a pin 14 seated in a radial hole 15 in the element 8e. This pin can also be threaded and screwed axially into the element to bear on the back of blade 6e as shown at 14' in FIG. 5A. The slots 13 are of different depths so that the blade 6e can be seated in that slot which gives it the desired 3-millimeter projection from the face of the element 8e in back of the surface 9e. A screw 16 parallel to the pin 14 serves to lock the blade 6e in place and can even function in the absence of abutment 14, it being understood that the blade itself locks the pin in place. The rear end 12 of the blade is curved out to receive this pin 14 as shown in FIG. 5B. It is also possible to use a wedge 14'' in the place of the pin 14 as shown in FIG. 5C. When the blade is worn the screw 16 is withdrawn, the blade 6e pulled out slightly and then the pin 14 pushed in one notch 13 further. The blade 6e is pushed back in until it seats, and the screw 16 tightened.

Figure 6:
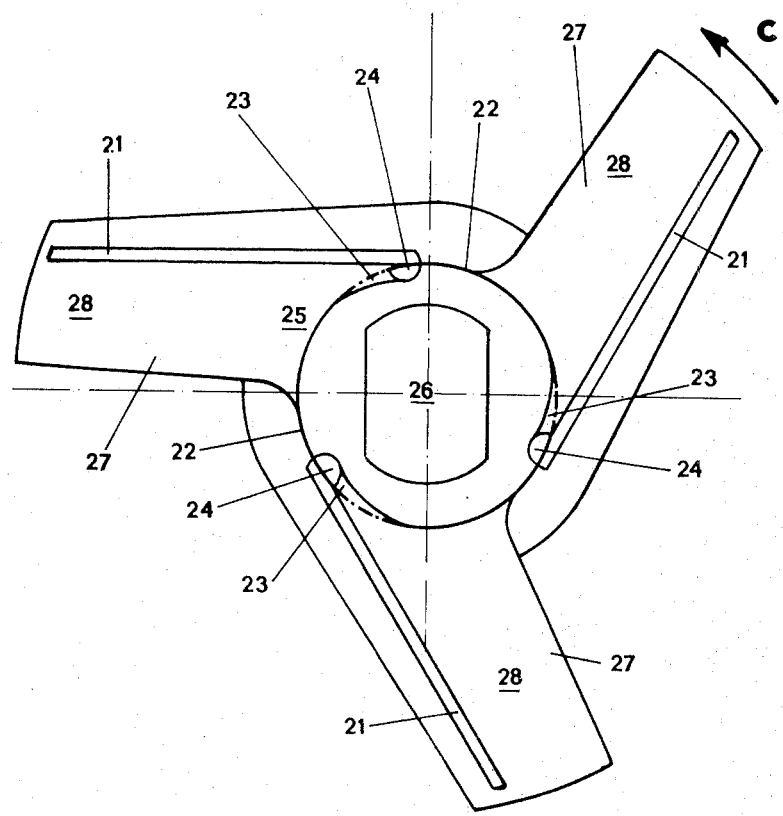
FIG. 6 is an end view of a rotor as shown in FIG. 2.
Figure 7:
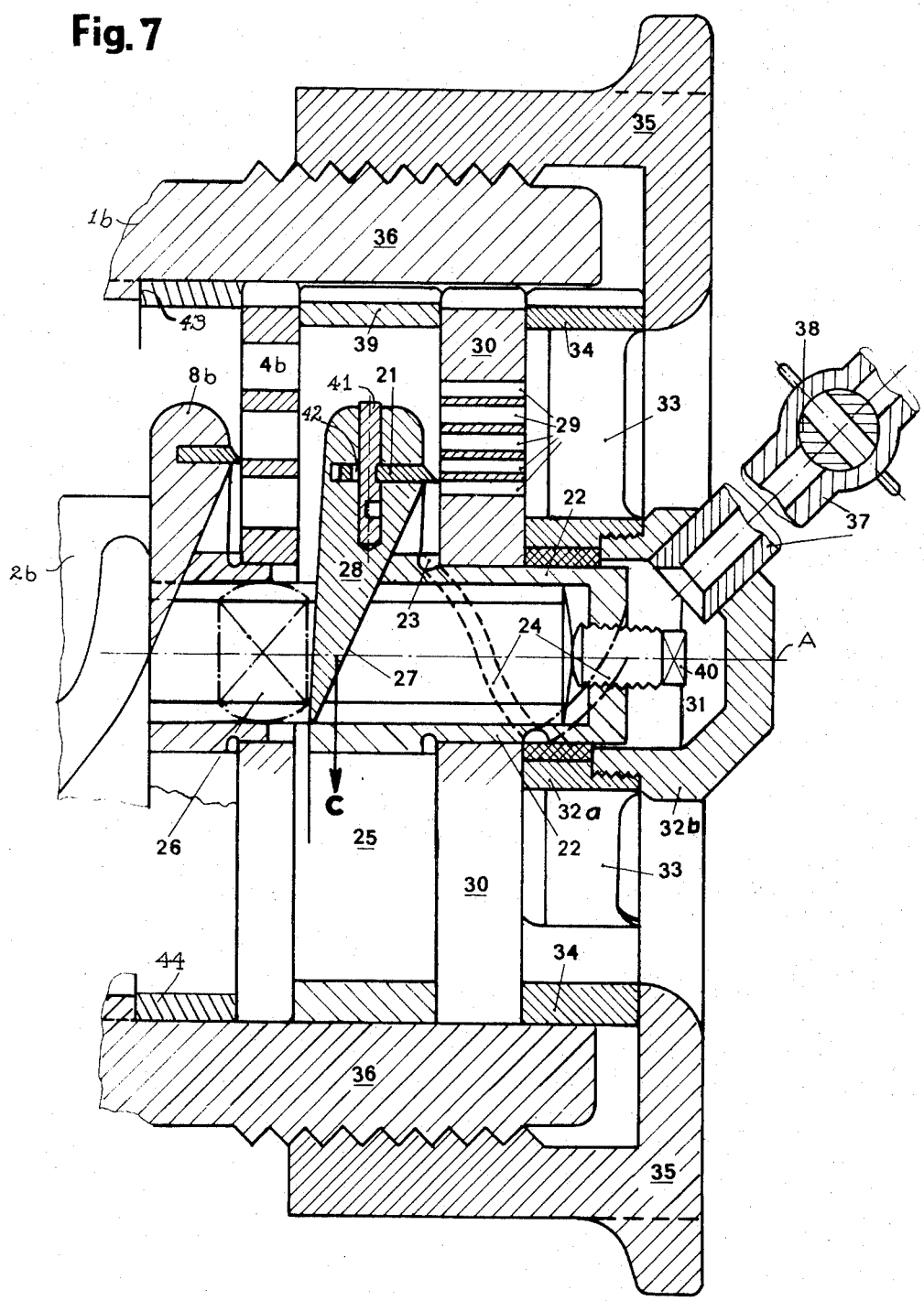
FIG. 7 is an axial section through an embodiment of the present invention employing a rotor as shown in FIG. 2 and a second cutter as shown in FIG. 6.

FIGS. 6 and 7 show a grinder which is specially constructed to prevent gristle, bone chips and the like from building up between the auger and the die plate. In this embodiment the blades 21 extend tangentially to the center hub 22 on the arms 28 of a cutter element spaced between a perforated plate 4b as described in reference to FIG. 2, which coacts with a cutter 8b and a screw 2b. The cutter 25 is formed at the base of each blade 21 with a notch 23 forming the end of a helical groove 24 on this hub 22. The blade carrier 8b and the cutter 25 are both mounted on a flatted shaft 26 passing axially out through the auger 2b and rotational relative thereto so that they rotate together about axis A in the sense of arrow c. Each arm 28 is also formed with a surface 27 inclined in the direction of rotation of the element 25 toward the plate 30 which is formed with holes 29.

The blades 21 are each formed with two holes 42 into which notch pins 41 can be fitted for adjustment as described with reference to FIG. 5. In addition a squarehead screw 40 screwed into the end of the hub 22 bears against the end of flatted shaft 26 to allow axial adjustment of the cutter 25.

As the cutter 25 is rotated, gristle and similar stringy or hard matter will move radially inwardly until it collects in the groove 24 and eventually move up into a chamber 31 at the end of the housing 1e which is threaded at 36 to secure a threaded cap 35. This chamber 31 is formed between an inner ring 32a connected by ribs 33 to an outer ring 34 clamped by the cap 35 against the circular plate 30 which in turn bears against a ring 39 braced against the plate 4b. A shoulder 43 on the housing 1b and another ring 44 support the perforated disk 4b. A short conduit 37 piercing the cap 32b is provided with a valve 38 that can be opened to empty this chamber 31. Unscrewing of the cap 32b allows the axial adjustment of the cutter 25 and cleaning of the chamber 31.

In use the auger and cutter-conveyor 8b function as described with reference to FIG. 2. The coarsely chopped foodstuff is then again minced by the cutter 25. Very fibrous pieces such as gristle or the like move through the groove 24 to the chamber 31 while the remaining matter is finely chopped in the smaller holes 29 of the plate 30.

The choppers according to the present invention are highly efficient since the food is pushed right up to the dies, and is then cut so that an axial buildup of pressure cannot take place. In the embodiment of FIGS. 6 and 7, for instance, it is possible to produce an extremely fine product by rotating the shaft 26 at very high speed, while the auger 2b is rotated just at a speed sufficient to maintain the desired throughput.

I claim:

1. A food chopper comprising:
   a housing having an elongated feed chamber;
   a perforated plate defining one end of said chamber;
   a conveyor in said chamber adjacent said plate having a surface directly juxtaposed with and inclined to said plate, said conveyor being rotatable in one sense such that said surface forces food against said plate;
   a blade on said conveyor trailing said surface in said sense and sweeping over said plate on rotation for cutting food extending into said plate;
   an auger having a worm and rotatable in said chamber about the same axis as said conveyor, said conveyor being between said auger and said plate; and
   means for adjusting the extent of projection of said blade from said conveyor toward said plate.

2. The chopper defined in claim 1 wherein said blade projects from said conveyor toward said plate by substantially 3 millimeters.

3. A food chopper comprising:
   a housing having an elongated feed chamber;
   a perforated plate defining one end of said chamber;
   a conveyor in said chamber adjacent said plate having a surface directly juxtaposed with and inclined to said plate, said conveyor being rotatable in one sense such that said surface forces food against said plate;
   a blade on said conveyor trailing said surface in said sense and sweeping over said plate on rotation for cutting food extending into said plate; and
   an auger having a worm and rotatable in said chamber about the same axis as said conveyor, said conveyor being between said auger and said plate, said worm being so formed that it advances food toward said plate on rotation of said auger about said axis in a sense oposite said one sense.

4. The chopper defined in claim 1 wherein said means includes an adjustment element received generally radially in said conveyor and constituting an abutment for the edge of said blade turned away from said plate.

5. A food chopper comprising:
a housing having an elongated feed chamber;
a perforated plate defining one end of said chamber;
a conveyor in said chamber adjacent said plate having a surface directly juxtaposed with and inclined to said plate, said conveyor being rotatable in one sense such that said surface forces food against said plate;
a blade on said conveyor trailing said surface in said sense and sweeping over said plate on rotation for cutting food extending into said plate; and
an auger having a worm and rotatable in said chamber about the same axis as said conveyor, said conveyor being between said auger and said plate, said conveyor having a hub being formed with at least one groove extending from the base of said blade at one side of said plate to the other side of the plate, said housing being formed at the other side of said plate with a closed chamber, whereby gristle and the like is conducted from said one side of said plate to said other side into said chamber on rotation of said conveyor.

6. The chopper defined in claim 5 wherein said groove is generally helical.

7. The chopper defined in claim 1, further comprising a second such conveyor and a second such plate in said housing arranged axially to the other side of said first-mentioned plate from said first-mentioned conveyor, said second conveyor being rotationally coupled to said first conveyor.

* * * * *